United States Patent
Gray et al.

(10) Patent No.: US 9,635,189 B1
(45) Date of Patent: Apr. 25, 2017

(54) SYSTEMS AND METHODS FOR CALCULATING PRICING ADJUSTMENTS FOR CAPITAL EQUIPMENT BASED ON GAMMA FACTORS

(71) Applicant: Level 3 Communications, LLC, Broomfield, CO (US)

(72) Inventors: William Gray, Boulder, CO (US); Benjamin K. Peterson, Superior, CO (US); Samid Ameer Hoda, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 619 days.

(21) Appl. No.: 14/170,794

(22) Filed: Feb. 3, 2014

Related U.S. Application Data

(60) Provisional application No. 61/775,320, filed on Mar. 8, 2013.

(51) Int. Cl.
*H04M 15/00* (2006.01)

(52) U.S. Cl.
CPC ................................. *H04M 15/80* (2013.01)

(58) Field of Classification Search
CPC ..................................................... H04M 15/80
USPC ........................................................... 235/378
See application file for complete search history.

(56) References Cited

U.S. PATENT DOCUMENTS

| | | | |
|---|---|---|---|
| 2002/0023060 A1* | 2/2002 | Cooney | G06Q 10/06 705/400 |
| 2004/0067748 A1* | 4/2004 | Johnson | G07F 17/0042 455/409 |

* cited by examiner

*Primary Examiner* — Toan Ly

(57) ABSTRACT

Aspects of the present disclosure involve systems and methods for calculating fractional capital equipment costs. Various factors are identified for a customer currently being provided with a service from a telecommunication service provider. Subsequently, the factors are processed to generate gamma, which quantifies the amount of capital equipment cost a telecommunication provider should apply to the customer.

21 Claims, 7 Drawing Sheets

0% Price Compression (YoY) — 302

| | Contract Term (Years) | | | | | | |
|---|---|---|---|---|---|---|---|
| | 1 | 2 | 3 | 4 | 5 | 6 | 7 |
| 1 | 100% | 191% | 274% | 349% | 417% | 479% | 536% |
| 2 | 52% | 100% | 143% | 183% | 218% | 251% | 281% |
| 3 | 37% | 70% | 100% | 127% | 152% | 175% | 196% |
| 4 | 29% | 55% | 78% | 100% | 109% | 137% | 154% |
| 5 | 24% | 46% | 66% | 84% | 100% | 115% | 128% |
| 6 | 21% | 40% | 57% | 73% | 87% | 100% | 112% |
| 7 | 19% | 36% | 51% | 65% | 78% | 89% | 100% |
| 8 | 17% | 33% | 47% | 59% | 71% | 82% | 91% |
| 9 | 16% | 30% | 43% | 55% | 66% | 76% | 85% |
| 10 | 15% | 28% | 40% | 52% | 62% | 71% | 79% |
| 15 | 12% | 23% | 33% | 42% | 50% | 57% | 64% |
| 20 | 11% | 20% | 29% | 37% | 45% | 51% | 57% |

Equipment Useful Life (Years)

5% Price Compression (YoY) — 304

| | Contract Term (Years) | | | | | | |
|---|---|---|---|---|---|---|---|
| | 1 | 2 | 3 | 4 | 5 | 6 | 7 |
| 1 | 100% | 186% | 261% | 325% | 381% | 429% | 471% |
| 2 | 54% | 100% | 140% | 175% | 204% | 230% | 252% |
| 3 | 38% | 71% | 100% | 125% | 146% | 164% | 180% |
| 4 | 31% | 57% | 80% | 100% | 117% | 132% | 145% |
| 5 | 26% | 49% | 68% | 85% | 100% | 113% | 124% |
| 6 | 23% | 43% | 61% | 76% | 89% | 100% | 110% |
| 7 | 21% | 40% | 55% | 69% | 81% | 91% | 100% |
| 8 | 20% | 37% | 52% | 64% | 75% | 85% | 93% |
| 9 | 19% | 35% | 49% | 61% | 71% | 80% | 88% |
| 10 | 18% | 33% | 46% | 58% | 68% | 76% | 83% |
| 15 | 15% | 29% | 40% | 50% | 58% | 66% | 72% |
| 20 | 14% | 27% | 38% | 47% | 55% | 62% | 68% |

Equipment Useful Life (Years)

10% Price Compression (YoY) — 306

| | Contract Term (Years) | | | | | | |
|---|---|---|---|---|---|---|---|
| | 1 | 2 | 3 | 4 | 5 | 6 | 7 |
| 1 | 100% | 182% | 249% | 304% | 348% | 385% | 415% |
| 2 | 55% | 100% | 137% | 167% | 192% | 212% | 228% |
| 3 | 40% | 73% | 100% | 122% | 140% | 155% | 167% |
| 4 | 33% | 60% | 82% | 100% | 115% | 127% | 137% |
| 5 | 29% | 52% | 71% | 87% | 100% | 111% | 119% |
| 6 | 26% | 47% | 65% | 79% | 90% | 100% | 108% |
| 7 | 24% | 44% | 60% | 73% | 84% | 93% | 100% |
| 8 | 23% | 41% | 57% | 69% | 79% | 88% | 94% |
| 9 | 22% | 40% | 54% | 66% | 76% | 84% | 90% |
| 10 | 21% | 38% | 52% | 64% | 73% | 81% | 87% |
| 15 | 19% | 35% | 48% | 58% | 67% | 74% | 79% |
| 20 | 19% | 34% | 46% | 56% | 65% | 71% | 77% |

Equipment Useful Life (Years)

15% Price Compression (YoY) — 308

| | Contract Term (Years) | | | | | | |
|---|---|---|---|---|---|---|---|
| | 1 | 2 | 3 | 4 | 5 | 6 | 7 |
| 1 | 100% | 177% | 237% | 283% | 319% | 346% | 369% |
| 2 | 56% | 100% | 133% | 160% | 180% | 195% | 207% |
| 3 | 42% | 75% | 100% | 119% | 135% | 146% | 155% |
| 4 | 35% | 63% | 84% | 100% | 113% | 122% | 130% |
| 5 | 31% | 56% | 74% | 89% | 100% | 109% | 115% |
| 6 | 29% | 51% | 68% | 82% | 92% | 100% | 106% |
| 7 | 27% | 48% | 64% | 77% | 87% | 94% | 100% |
| 8 | 26% | 46% | 62% | 74% | 83% | 90% | 96% |
| 9 | 25% | 45% | 60% | 71% | 80% | 87% | 93% |
| 10 | 25% | 44% | 58% | 70% | 78% | 85% | 90% |
| 15 | 23% | 41% | 55% | 66% | 74% | 80% | 85% |
| 20 | 23% | 41% | 54% | 65% | 73% | 79% | 84% |

Equipment Useful Life (Years)

FIG. 3A

20% Price Compression (YoY) (310)

| Equipment Useful Life (Years) | Contract Term (Years) | | | | | | |
|---|---|---|---|---|---|---|---|
| | 1 | 2 | 3 | 4 | 5 | 6 | 7 |
| 1 | 100% | 173% | 226% | 264% | 292% | 312% | 327% |
| 2 | 58% | 100% | 131% | 153% | 169% | 181% | 189% |
| 3 | 44% | 77% | 100% | 117% | 129% | 138% | 145% |
| 4 | 38% | 65% | 85% | 100% | 111% | 118% | 124% |
| 5 | 34% | 59% | 77% | 90% | 100% | 107% | 112% |
| 6 | 32% | 55% | 72% | 85% | 93% | 100% | 105% |
| 7 | 31% | 53% | 69% | 81% | 89% | 95% | 100% |
| 8 | 30% | 51% | 67% | 78% | 86% | 92% | 97% |
| 9 | 29% | 50% | 65% | 76% | 84% | 90% | 95% |
| 10 | 28% | 49% | 64% | 75% | 83% | 89% | 93% |
| 15 | 28% | 48% | 62% | 73% | 80% | 86% | 90% |
| 20 | 27% | 47% | 62% | 72% | 80% | 85% | 89% |

25% Price Compression (YoY) (312)

| Equipment Useful Life (Years) | Contract Term (Years) | | | | | | |
|---|---|---|---|---|---|---|---|
| | 1 | 2 | 3 | 4 | 5 | 6 | 7 |
| 1 | 100% | 168% | 215% | 246% | 268% | 283% | 293% |
| 2 | 59% | 100% | 128% | 146% | 159% | 168% | 174% |
| 3 | 47% | 78% | 100% | 115% | 125% | 132% | 136% |
| 4 | 41% | 68% | 87% | 100% | 109% | 115% | 119% |
| 5 | 37% | 63% | 80% | 92% | 100% | 105% | 109% |
| 6 | 35% | 59% | 76% | 87% | 95% | 100% | 104% |
| 7 | 34% | 57% | 73% | 84% | 92% | 97% | 100% |
| 8 | 33% | 56% | 72% | 82% | 89% | 94% | 98% |
| 9 | 33% | 55% | 71% | 81% | 88% | 93% | 96% |
| 10 | 33% | 55% | 70% | 80% | 87% | 92% | 95% |
| 15 | 32% | 54% | 69% | 79% | 86% | 90% | 93% |
| 20 | 32% | 54% | 68% | 78% | 85% | 90% | 93% |

30% Price Compression (YoY) (314)

| Equipment Useful Life (Years) | Contract Term (Years) | | | | | | |
|---|---|---|---|---|---|---|---|
| | 1 | 2 | 3 | 4 | 5 | 6 | 7 |
| 1 | 100% | 164% | 204% | 230% | 246% | 257% | 263% |
| 2 | 61% | 100% | 125% | 140% | 151% | 157% | 161% |
| 3 | 49% | 80% | 100% | 113% | 121% | 126% | 129% |
| 4 | 43% | 71% | 89% | 100% | 107% | 112% | 115% |
| 5 | 41% | 66% | 83% | 93% | 100% | 104% | 107% |
| 6 | 39% | 64% | 80% | 90% | 96% | 100% | 103% |
| 7 | 38% | 62% | 78% | 87% | 94% | 97% | 100% |
| 8 | 37% | 61% | 76% | 86% | 92% | 96% | 98% |
| 9 | 37% | 61% | 76% | 85% | 91% | 95% | 97% |
| 10 | 37% | 60% | 75% | 85% | 91% | 94% | 97% |
| 15 | 36% | 60% | 74% | 84% | 90% | 93% | 96% |
| 20 | 36% | 60% | 74% | 84% | 90% | 93% | 96% |

35% Price Compression (YoY) (316)

| Equipment Useful Life (Years) | Contract Term (Years) | | | | | | |
|---|---|---|---|---|---|---|---|
| | 1 | 2 | 3 | 4 | 5 | 6 | 7 |
| 1 | 100% | 159% | 194% | 215% | 227% | 234% | 238% |
| 2 | 63% | 100% | 122% | 135% | 143% | 147% | 150% |
| 3 | 52% | 82% | 100% | 111% | 117% | 121% | 123% |
| 4 | 47% | 74% | 90% | 100% | 106% | 109% | 111% |
| 5 | 44% | 70% | 86% | 95% | 100% | 103% | 105% |
| 6 | 43% | 68% | 83% | 92% | 97% | 100% | 102% |
| 7 | 42% | 67% | 81% | 90% | 95% | 98% | 100% |
| 8 | 42% | 66% | 81% | 89% | 94% | 97% | 99% |
| 9 | 41% | 66% | 80% | 89% | 94% | 97% | 98% |
| 10 | 41% | 65% | 80% | 88% | 93% | 96% | 98% |
| 15 | 41% | 65% | 79% | 88% | 93% | 96% | 98% |
| 20 | 41% | 65% | 79% | 88% | 93% | 96% | 97% |

FIG. 3B

SYSTEMS AND METHODS FOR CALCULATING PRICING ADJUSTMENTS FOR CAPITAL EQUIPMENT BASED ON GAMMA FACTORS

CROSS REFERENCE TO RELATED APPLICATION

The present non-provisional utility application claims priority under 35 U.S.C. §119(e) to co-pending provisional application No. 61/775,320 entitled "Computer System And Method For Generating A Gamma Factor To Account For price Compression In Deal Costing And Pricing," filed on Mar. 8, 2013 and which is hereby incorporated by reference herein.

TECHNICAL FIELD

Aspects of the present disclosure relate to assessing capital equipment, and in particular, calculating cost and pricing schemes that account for the life of capital equipment based on one or more metrical factors.

BACKGROUND

Within capital intensive industries, such as the telecommunications industry, service providers must invest significant amounts of capital into developing the infrastructure required to provision and deliver services to customers. Moreover, once the initial investment in infrastructure has been made, such service providers must invest in the maintenance and development of new and/or existing infrastructure in order to ensure that the service providers have the capability to be responsive to ever-changing customer needs. For example, because large-scale communication networks cannot be developed and deployed instantly, telecommunication service providers must continually invest in the communication networks to ensure that future growth and demands may be met. Thus, a large portion of the costs in the telecommunications industry can be attributed to long-term investments in infrastructure required to provide services to customers.

The measurement of the cost of such capital investment is important in the estimation process for determining pricing schemes for customers. Stated differently, the price that a telecommunication service provider charges for services takes into account the infrastructural costs incurred to provide such services. While several models and frameworks have been developed by financial communities to account for the cost of capital investment in pricing, most of such models are generalized and not applicable under more particular circumstances. Using such conventional models and frameworks may result in inconsistencies and imprecision.

It is with these concepts in mind, among others, that various aspects of the present disclosure were conceived and developed.

SUMMARY

Aspects of the present disclosure include systems for calculating fractional capital equipment costs. The system includes a database containing contract data. The system further includes at least one processor in operable communication with the database to process the contract data to identify one or more factors corresponding to a potential customer of a service provided by a telecommunication service provider, the service requiring use of capital equipment. The at least one processor is further configured to calculate a fraction of capital equipment cost value corresponding to the capital equipment based on the factors. The at least one processor is further configured to execute a customer deal evaluation model to generate a pricing scheme corresponding to the service and the customer, based on a total cost of acquiring capital value and the fraction of capital equipment cost value.

Aspects of the present disclosure include systems for calculating fractional capital equipment costs. The system includes a database containing contract data. The system further includes at least one processor in operable communication with the database to process the contract data to identify one or more factors corresponding to a customer of a service provided by a telecommunication service provider, the service requiring use of capital equipment. The at least one processor is further configured to calculate a fraction of capital equipment cost value corresponding to the capital equipment based on the factors. The at least one processor is further configured to execute a customer deal evaluation model to generate a pricing scheme corresponding to the service and the customer, based on a total cost of acquiring capital value and the fraction of capital equipment cost value.

Aspects of the present disclosure include methods for calculating fractional capital equipment costs. The method includes processing, at at least one processor, customer data corresponding to a potential customer of a service provided by a telecommunication service provider to identify one or more factors, the service requiring use of capital equipment. The method further includes calculating a fraction of capital equipment cost value corresponding to the capital equipment based on the factors. The method includes executing a customer deal evaluation model to generate a pricing scheme corresponding to the service and the customer, based on a total cost of acquiring capital value and the fraction of capital equipment cost value.

Aspects of the present disclosure include non-transitory computer readable medium for including instructions for calculating fractional capital equipment costs. The instructions, executable by a processor, include obtaining customer data corresponding to a potential customer of a service from a telecommunication service provider, the service requiring use of capital equipment. The instructions include processing the customer data to identify one or more factors. The instructions include calculating a fraction of capital equipment cost value corresponding to the capital equipment based on the factors. The instructions include executing a customer deal evaluation model to generate a pricing scheme corresponding to the service and the customer based on a total cost of acquiring capital value and the fraction of capital equipment cost value.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

FIGS. 3A-3B are diagrams of price compression tables, according to aspects of the present disclosure.

DETAILED DESCRIPTION

Figure 1:
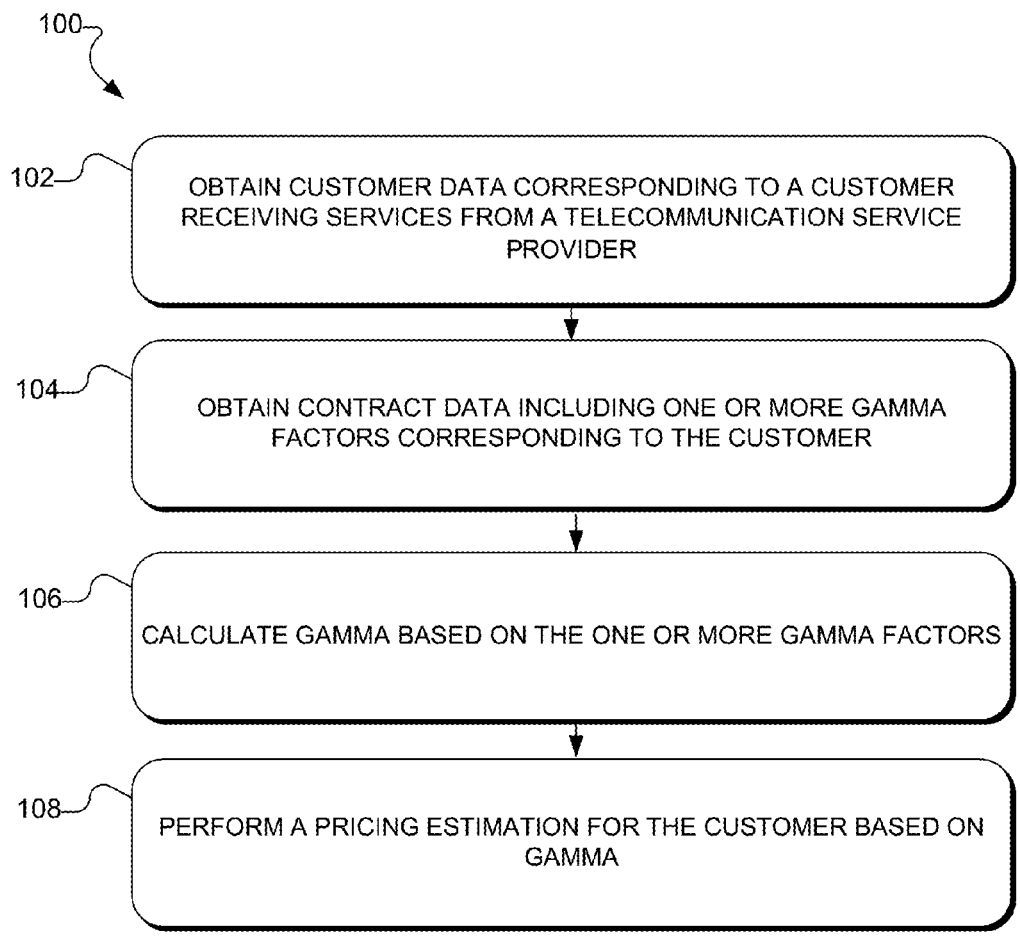
FIG. 1 is a flow chart for applications, according to aspects of the present disclosure.

Aspects of the present disclosure involve methods and systems for calculating fractional capital equipment costs. More specifically, one or more factors (referred to herein as "gamma factors") may be identified and processed to generate a fraction of capital equipment cost value (referred to herein as "Gamma"). Gamma quantifies the amount of capital equipment cost a customer of a service provider, such as telecommunications service provider, should incur when taking into account a possible declining and decelerating revenue stream from the customer. Stated differently, Gamma may be used to determine the amount of capital equipment cost that a customer service contract should recover for a service provider from a customer due to the customer's and/or potential customer's reduction in service use over time. Gamma may be used to execute various pricing evaluations of a customer, in various pricing estimations for the customer, and/or various other calculations, such as for example, when calculating the net present value of a capital equipment investment based on the capital equipment's expected revenue stream.

Capital costs typically represent one-time expenses incurred by a business to purchase land and/or buildings, undergo construction, and/or purchase equipment used in the production of goods or in the rendering of services. Stated differently, capital costs represent the total costs incurred by a business to enable the business to perform its intended business transactions. Unlike operating costs, capital costs are considered a one-time expense, but payment may be spread out over many years when a business is reporting its accounting and taxes.

Within the telecommunications industry, capital costs are often associated with the infrastructure required to provide various telecommunication products and/or services to customers. For example, products such as Internet services, private line services, content delivery network services, voice over Internet protocol (VOIP) services, Internet broadcasting services, unified communications, converged data and voice services, cloud computing services, contact center services, Ethernet services, and the like, are provided by telecommunication service providers to customers. In order to provide such services, infrastructure such as communication networks containing switches, routers, gateways, servers, transmitters, receivers, and communication channels that handle voice and data between devices. For example, fiber optic represents a particular type of communication channel medium that is often used in the telecommunication industry to carry telecommunication services to customers. The infrastructure required to enable fiber optic communication is both complex and expensive. Moreover, the cost to lay fiber and connect a customer is also very expensive.

Due to the significant capital expenditure involved in deploying telecommunication infrastructure, investment recovery periods tend to be longer than in other industries. Thus, using conventional models to estimate pricing for products and/or services offered to customers may present challenges and result in inconsistencies and imprecise calculations. For example, many conventional methodologies assume that the prices for offering any product or service to customers will rise over time. However, in some industries, such as the telecommunications industry, the market price of the service utilizing the capital equipment may decline over time, such that the revenue from successive service contracts is expected to be nominally less than the revenue from the current service contract. Moreover, often times, telecommunication service providers often offer services to customers where the contract term is significantly shorter than the useful life of the capital equipment required to deliver the service.

Aspects of the present disclosure provide automated systems and methods configured to receive customer and contract data corresponding to a particular customer and subsequently process the data to calculate Gamma. Subsequently, the various systems and methods may automatically execute one or more price evaluations and/or pricing estimations models corresponding to the customer based on the calculated Gamma value to generate a pricing scheme for the customer.

Figure 2:
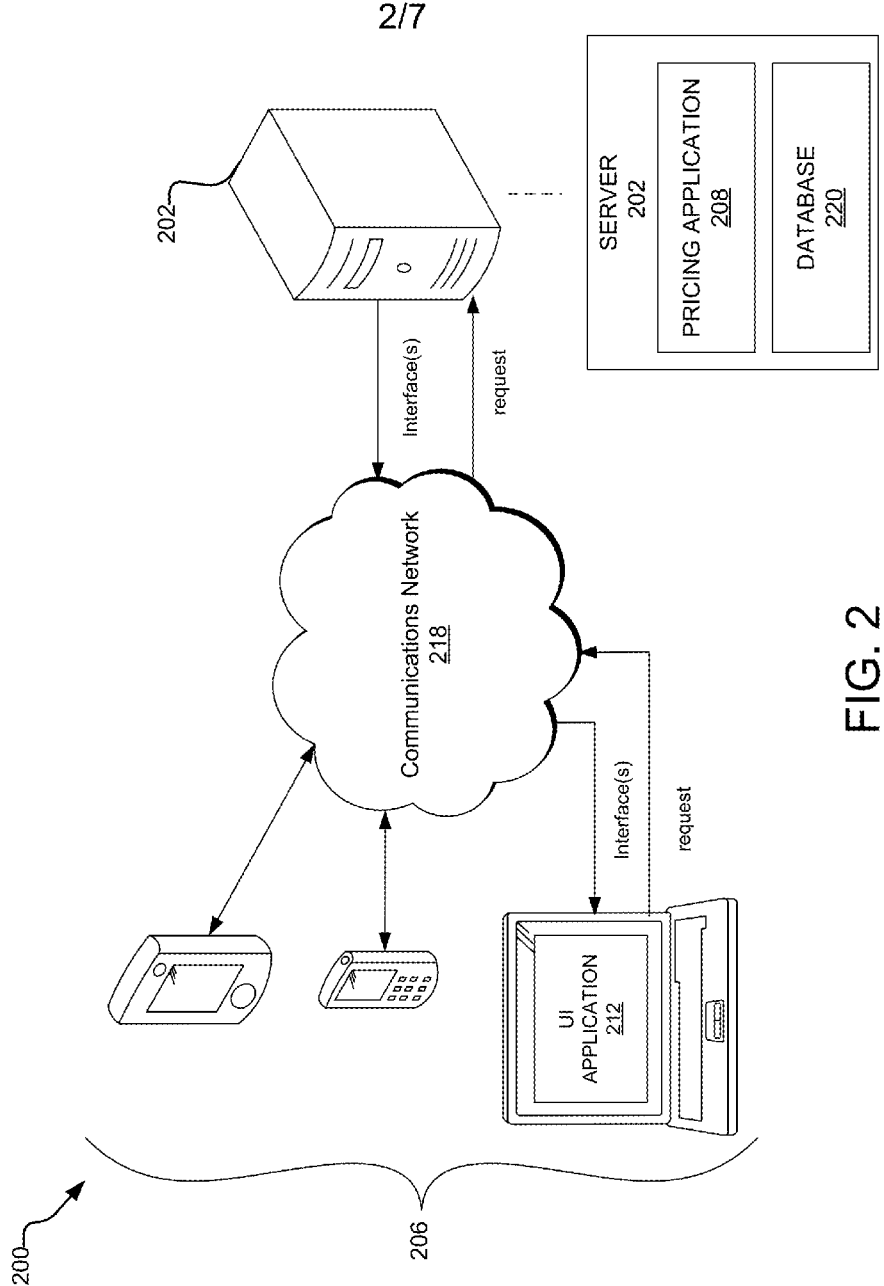
FIG. 2 is block diagram illustrating a computing environment for calculating gamma, according to aspects of the present disclosure.

An illustrative process and system for calculating Gamma, which may be used to perform cost-based pricing estimations and/or price evaluations of a customer and/or potential customer, is depicted in FIGS. 1-2. In particular, FIG. 1 illustrates an example process 100 for determining one or more gamma factors that may be used to calculate Gamma. FIG. 2 illustrates a computing environment 200 including a server 202 configured to calculate gamma and perform pricing estimations. Thus, FIG. 2 illustrates a computing environment 200 including a server 202 operating in conjunction with various other hardware and/or software components (operating on hardware) that may be used to perform or otherwise execute the process 100.

Referring now to FIG. 1, process 100 begins with obtaining customer data for customers accessing services and/or potential customers interested in accessing services currently being offered by a service provider, such as a telecommunication service provider (operation 102). Customer data includes any information and/or data that may be used to identify a specific customer and any products and/or services currently being provided to the customer by a telecommunications service provider. For example, assume a telecommunication service provider is offering VOIP services to customer "A" and cloud computing services to customer "B". The customer data may include information that identifies customer "A" (name, account number, etc.) and information indicating that customer "A" is currently receiving VOIP services. Additionally, the customer data may include information identifying customer "B" and information indicating that customer "B" is currently receiving cloud computing services.

In addition to obtaining customer data, contract data corresponding to the customer may be received or otherwise obtained (operation 104). Contract data may include contractual information describing the specific contract terms between a customer and the telecommunication service provider. For example, the contractual information may include one or more gamma factors, any of which, or combination thereof, may be used in calculation of Gamma. For example, the gamma factors may include a "contract term length" factor that defines the contract term length between a given customer and a service provider. The contract term length factor may describe duration of the contract and may be based on a calendar year (e.g. monthly, yearly, and the like). The gamma factors may also include a "capital equipment useful life" factor quantifying the useful life of the equipment required to provide the service. The gamma factors may further include a "price compression rate" factor, which quantifies the rate at which prices may decline over the life of the contract. The gamma factors may include a "capital discount rate" factor that quantifies the cost of capital of the equipment required to provide the service. Capital costs are fixed, one-time expenses incurred on the purchase of land, buildings, construction, and equipment used in the production of goods or in the rendering of services. Accordingly, in one particular embodiment, "Capital costs" may be the total present day costs of the capital equipment and capital maintenance required to support a service for its useful life, offered by a telecommunication service provider, without accounting for gamma. It is contemplated that any contractual information articulating the agreement between a customer and a telecommunication service provider may be included in the contract data. Hence, some of the contract data is used by the system to extract the gamma factors.

The customer data and any corresponding contract data may be obtained, received, etc., at the server 202, which may be a personal computer, work station, server, mobile device, mobile phone, processor, and/or other type of processing device and may include one or more processors that process software or other machine-readable instructions. In particular, the server 202 may provide a mechanism, process, and/or application, such as a pricing application 208, which, when executed, processes any obtained gamma factors to calculate Gamma and various pricing estimations. The server 202 may further include a memory to store the software or other machine-readable instructions and data and a communication system to communicate via a wireline and/or wireless communications, such as through the Internet, an intranet, and Ethernet network, a wireline network, a wireless network, and/or another communication network. Finally, the server 202 may include or otherwise be in communication with a database 220 and may include memory and one or more processors or processing systems to receive the customer data and the contract data and process, query and transmit communications and store and retrieve the data. Although the database 220 of FIG. 2 is depicted as being located within the server 202, it is contemplated that the database 220 may be located external to the server 202, such as at a remote location, and may communicate with the server 202 via a communications network 218.

A user interested in calculating Gamma and estimating pricing for a customer may interact with one or more client devices 206 to initiate a request, which may be received by the server 202. More particularly, the one or more client devices 206 may also include a user interface ("UI") application 212, such as a browser application, to generate a request for calculating Gamma. In response, the server 202 may transmit instructions that may be processed and/or executed to generate, or otherwise display, one or more interfaces or input forms (e.g. a graphical user-interface), which may include interactive elements, such as buttons, forms, fields, selections, inputs, streams, etc., for enabling a user to generate the request for calculating gamma.

The one or more client devices 206 may be a personal computer, work station, server, mobile device, mobile phone, tablet device, processor, and/or other processing device capable of implementing and/or executing processes, instructions, software, applications, etc. Additionally, the one or more client devices 206 may include one or more processors that process software or other machine-readable instructions and may include a memory to store the software or other machine-readable instructions and data. The one or more client devices 206 may also include a communication system to communicate with the various components of the server 202 via a wireline and/or wireless communications, such as through the network 218, such as the Internet, an intranet, an Ethernet network, a wireline network, a wireless network, a mobile communications network, and/or another communication network. While the pricing application 208 has been illustrated as being located within the server 202, it is contemplated that the pricing application 208 may be executed entirely at a client device (e.g. client devices 206) without the server 202, or elsewhere.

Referring again to FIG. 1, any identified gamma factors may be used to calculate Gamma (operation 106). In one embodiment, Gamma may be quantified as the fraction of: 1) revenue, in present value terms, derived from the customer service contract under consideration; over 2) total revenue, in present terms, of all revenue that is expected to be derived from the equipment.

The derivation of Gamma may be obtained according to the following equations:

$$\gamma = \frac{\sum_{t=0}^{T-1} r^t}{\sum_{t=o}^{U-1} r^t}, r = \frac{1-c}{1+d}$$

where $\gamma$=Gamma, T=the contract term, U=the useful life of the equipment, c=the price compression rate, and d=capital discount rate (e.g. weighted average cost of capital ("WACC"). Substituting the geometric series for:

$$\sum_{k=0}^{n-1} r^k = \frac{1-r^n}{1-r}$$

results in:

$$\gamma = \frac{\sum_{t=0}^{T-1} r^t}{\sum_{t=o}^{U-1} r^t} = \frac{\frac{1-r^T}{1-r}}{\frac{1-r^U}{1-r}} = \frac{1-r^T}{1-r^U}$$

All of such equations and/or derivations may be used to calculate or otherwise determine Gamma. Referring to FIG. 2, the server 202 is configured to execute the $\gamma$ equation using the received data (e.g. gamma factors). For example, the $\gamma$ equation may be included and one or more instructions, processes, or functions of the pricing application 208.

Figure 3C:
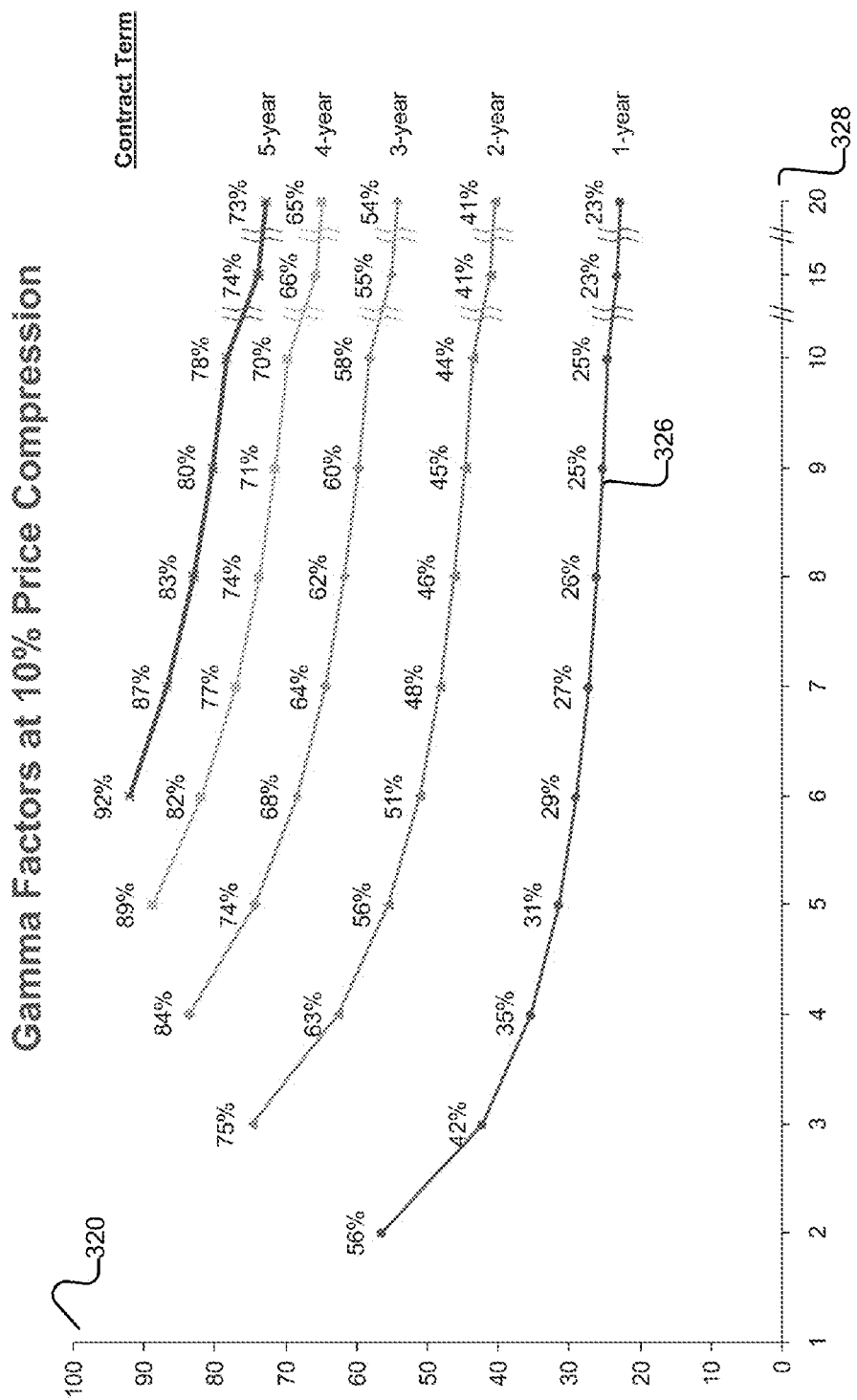
FIG. 3C is a graph illustrating a price compression, according to aspects of the present disclosure.

In alternative embodiments, one or more price compression tables maintained within the database 220 may be used to identify the price compression rate required within the γ equation. FIGS. 3A-3B illustrate various price compression tables, for a pre-determined discount rate of 10%, that may be used to determine γ, or Gamma. Each price compression table corresponds to a particular price compression percentage. For example, as illustrated in FIGS. 3A-3B: table 302 corresponds to a 0% price compression; table 304 corresponds to a 5% price compression; table 306 corresponds to a 10% price compression; table 308 corresponds to a 15% price compression; table 310 corresponds to a 20% price compression; table 312 corresponds to a 25% price compression; table 314 corresponds to a 30% price compression; and table 316 corresponds to a 35% price compression. It is contemplated that a table could correspond to any price compression percentage from 0%-100%. FIG. 3C is yet another illustration of the relationship between Gamma 320, a price compression rate (in the illustrated example 10%), the useful life 328 of equipment and the length of the contract (in the illustrated example between 1 and 5 years) for a predetermined capital discount rate of 10%. Referring to a 1 year contract 326 of a price compression rate of 10%, the line shows γ, or Gamma for different equipment useful life values.

The various price compression tables are depicted as two-variable data tables, although other types of tables may be used. For example, referring to table 302 of FIG. 3A, each row corresponds to a variable defining the useful life of equipment in years and each column within the table corresponds to a specific contract term in years. Both of these gamma factor values may be used as input to identify a specific Gamma value or percentage. For example, referring again to the pricing compression table 306 of 10%, an equipment useful life of 5 year and a contract term of 1 year's results in a Gamma of 29%. Alternatively, an equipment useful life of 5 years and a contract term of 3 years results in a Gamma of 71%.

Referring again to FIG. 1, once Gamma has been calculated or otherwise determined, a pricing estimation and/or evaluation for a customer receiving services, or a potential customer seeking services, from a telecommunications service provider may be performed (operation 108). A customer evaluation may be performed using several metrics including net present value ("NPV"), internal rate of return ("IRR"), payback, cash flow, etc. In one embodiment, each of such various metrics may be executed in conjunction with a customer deal evaluation model, which may be used to calculate the expected NPV, IRR, payback period, and other commonly used financial metrics. These metrics are subsequently compared against pre-set requirements for generating deal-specific pricing schemes. For example, a telecommunication service provider, interested in performing such an analysis, may calculate the applicable metrics for the customer contract under consideration, apply Gamma to the capital cost consideration portion and/or one or more of the calculated metrics, and subsequently compare the Gamma-adjusted metrics to pre-set, acceptable, requirements. Any of such comparisons may be generated or otherwise provided for display, such as at a graphical user-interface, a user-interface, and/or the like. For example, in one embodiment, a pricing-scheme report may be generated that depicts (e.g. graphically) the various Gamma-adjusted metrics and corresponding pre-set requirements for a particular customer and/or potential customer.

For example, a net present value ("NPV") pricing calculation, modified to account for Gamma, may be executed to determine a NPV of cash flow. NPV represents a discounted cash flow analysis and is a standard method for using the time-value of money to appraise long-term capital investments and projects. Thus, NPV measures the excess or shortfall of cash flows, in present value terms, above the cost of capital. Any customer service NPV calculation is adjusted using Gamma to account for the Gamma factors associated with the capital equipment and the customer contract under consideration.

Any calculated NPV may be used to validate a potential pricing scheme for a particular customer. For example, a telecommunication service provider may stipulate that an NPV value threshold of at least $1,000 is required for all customer pricing schemes generated during a pricing evaluation. The NPV metric for of a deal could be calculated to account for Gamma, at various permutations of potential price points and contract terms, and options that do not meet the NPV threshold would be rejected.

Figure 4:
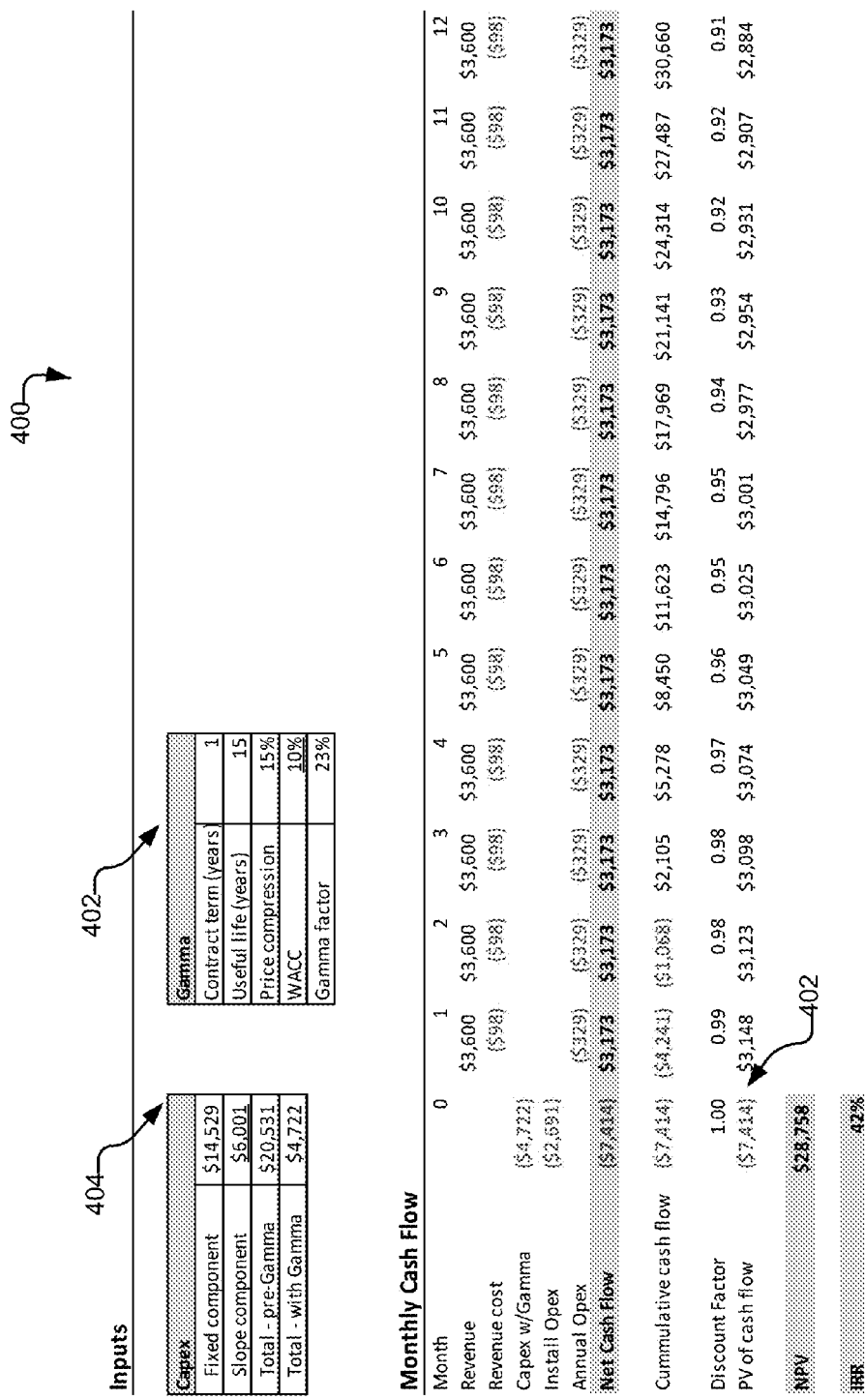
FIG. 4 is a block diagram illustrating and example price estimation, according to aspects of the present disclosure.

FIG. 4 is an example interface 400 illustrating the calculation of NPV that accounts for Gamma and is for a potential service contract offered by a telecommunication service provider, according to one embodiment. Such interfaces may be generated by the various processing devices disclosed herein. Assume the potential customer is currently involved in considering a one (1) year contract for 10G wavelength, unprotected service and the terms of the contract include providing the wavelength services to the potential customer for a period of time that is shorter in duration than the capital equipment's (e.g. the wavelength infrastructure) useful life. As illustrated in the Gamma table 402, a Gamma factor of 23% has been calculated from one or more gamma factors including a contract term of 1 year, a useful life of 15 years, and a price compression rate of 15%. The total cost of expenditures 404 (capex) without accounting for gamma is calculated at $20,531, which when multiplied by gamma, results in a new, price-adjusted total cost of expenditures of $4,722. Subsequently, the new cost of expenditures accounting for Gamma is used to calculate the NPV, effectively accounting for Gamma in the price estimation for customers.

Gamma may be applied to the various other metrics used to perform the pricing estimation and/or evaluation for a customer and the various interfaces generated by the server 202 may correspond to such metrics. For example, Gamma may be applied to the capital equipment IRR metric. Assume a telecommunication service provider requires an IRR threshold of at least 30%. An IRR calculation could be calculated accounting for Gamma, at various permutations of potential price points and contract terms. Any calculated IRR values that do not meet the 30% threshold would be rejected.

Figure 5:
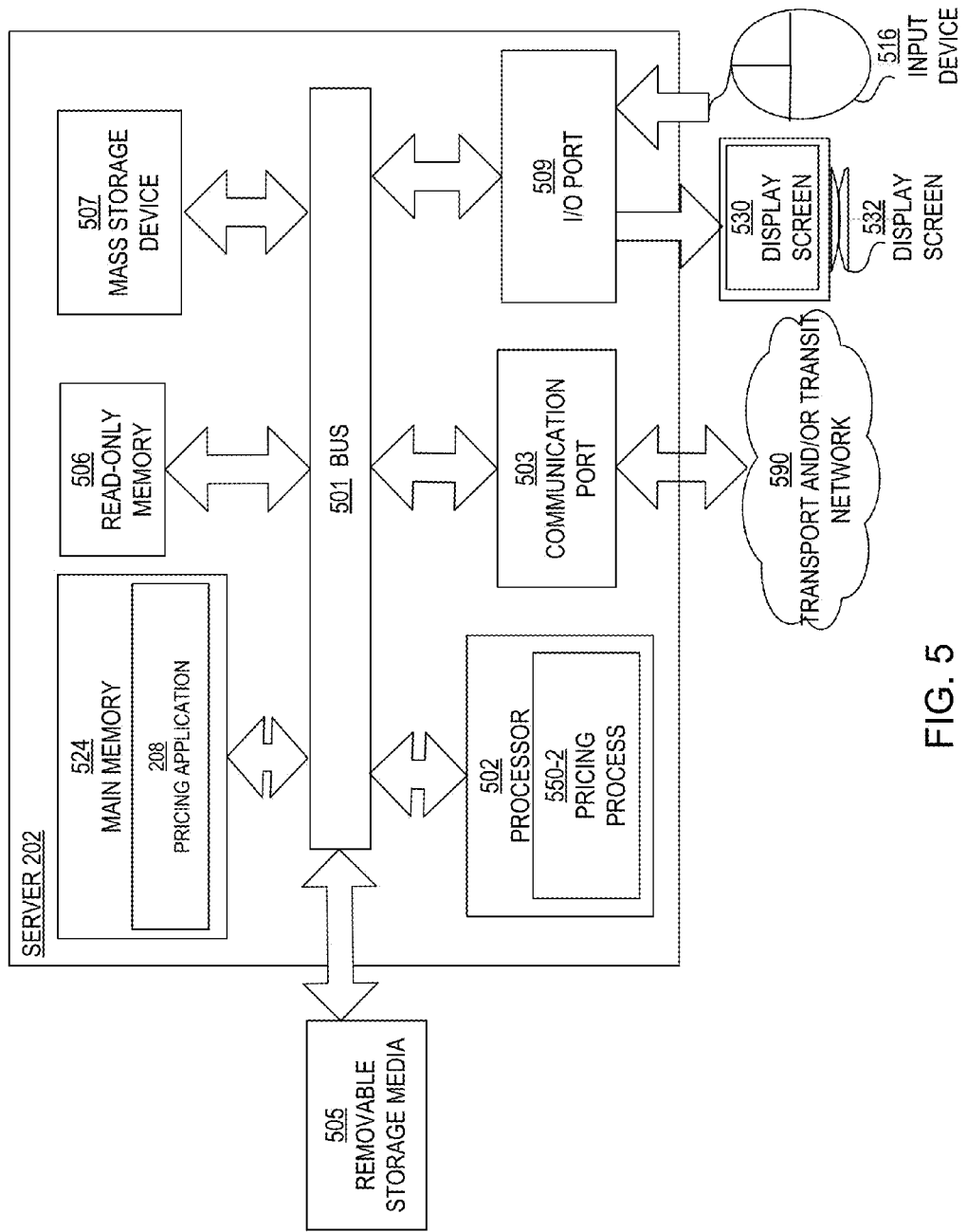
FIG. 5 is an example computing environment, according to aspects of the present disclosure.

FIG. 5 is example schematic diagram of a computing system implementing a server 202 that may be used to calculate Gamma and perform pricing estimations, according to one embodiment. The computing system for the server 202 includes a bus 501 (i.e., interconnect), at least one processor 502, at least one communication port 503, a main memory 504, a removable storage media 505, a read-only memory 506, and a mass storage device 507. Processor(s) 502 can be any known processor, such as, but not limited to, an Intel® Itanium® or Itanium 2® processor(s), AMD® Opteron® or Athlon MP® processor(s), or Motorola® lines of processors. Communication port 503 can be any of an RS-232 port for use with a modem based dial-up connection, a 10/100 Ethernet port, a Gigabit port using copper or fiber, or a USB port. Communication port(s) 503 may be chosen depending on a network such as a Local Area Network (LAN), a Wide Area Network (WAN), or any network to which the computer system 100 connects. The server 202 may be in communication with peripheral devices (e.g., display screen 530, input device 516 via Input/Output (I/O) port 509.

Main memory 504 can be Random Access Memory (RAM) or any other dynamic storage device(s) commonly known in the art. Read-only memory 506 can be any static storage device(s) such as Programmable Read-Only Memory (PROM) chips for storing static information such as instructions for processor 502. Mass storage device 507 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 501 communicatively couples processor(s) 502 with the other memory, storage and communications blocks. Bus 501 can be a PCI/PCI-X, SCSI, or Universal Serial Bus (USB) based system bus (or other) depending on the storage devices used. Removable storage media 505 can be any kind of external hard drives, floppy drives, OMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory 504 is encoded with the pricing application 208 that supports functionality as discussed above and as discussed further below. For example, in one embodiment, the pricing application 208 may include or otherwise implement the various processes and/or instructions described herein. The pricing application 208 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret or otherwise perform the logic instructions of the pricing application 208. Execution of the pricing application 208 produces processing functionality in application process 550-2. In other words, the pricing process 550-2 represents one or more portions of the pricing application 550-1 performing within or upon the processor(s) 202 in the computer system 500.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for calculating fractional capital equipment costs comprising:
   a database containing contract data; and
   at least one processor in operable communication with the database to:
      provide a graphical user interface for receiving an instruction to perform a customer deal evaluation;
      retrieve the contract data from the database;
      process the contract data to identify one or more factors corresponding to a potential customer of a service provided by a telecommunication service provider, the service requiring use of capital equipment, wherein the capital equipment comprises infrastructure needed for the telecommunication service provider to provide the service;
      calculate a fraction of capital equipment cost value corresponding to the capital equipment based on the factors;
      execute a customer deal evaluation model to generate a pricing scheme corresponding to the service and the customer, based on a total cost of acquiring capital value and the fraction of capital equipment cost value; and
      automatically cause the pricing scheme to be displayed in the graphical user interface.

2. The system of claim 1, wherein executing a customer deal evaluation model based on the total cost of acquiring capital value and the fraction of capital equipment cost value comprises:
   multiplying the total cost of acquiring capital value by the fraction of capital equipment cost value to generate a result; and
   calculating at least one customer evaluation metric, adjusted according to the result.

3. The system of claim 2, wherein the metric is selected from at least one of a net present value metric, an internal rate of return metric, a payback metric, or an EBITDA less CapEx metric.

4. The system of claim 1, wherein the one or more factors is at least one of a contract term length, a useful equipment life value, a price compression rate, and a capital discount rate.

5. The system of claim 1, wherein at least one processor is further configured to:
receive customer data uniquely identifying the customer and the contract data from a user-interface.

6. The system of claim 1, wherein the one or more factors includes a price compression percentage and wherein calculating the fraction of capital equipment cost value comprises accessing a price compression table stored in the database corresponding to the price compression percentage to determine the fraction of capital equipment cost value.

7. The system of claim 1, wherein the one or more factors includes a contract term, a useful equipment life value, a price compression rate, and a capital discount rate and wherein the fraction of capital equipment cost value is calculated using the following equation:

$$\gamma = \frac{\sum_{t=o}^{T-1} r^t}{\sum_{t=0}^{U-1} r^t} = \frac{\frac{1-r^T}{1-r}}{\frac{1-r^U}{1-r}} = \frac{1-r^T}{1-r^U}$$

wherein $\gamma$ is the fraction of capital equipment, T is the contract term, U is the useful equipment life value, c is the price compression rate, d is the capital discount rate, and r is equal to $(1-c)/(1+d)$.

8. A method for calculating fractional capital equipment costs comprising:
providing a graphical user interface for receiving an instruction to perform a customer deal evaluation;
retrieving contract data from a database;
processing, by at least one processor, customer data corresponding to a potential customer of a service provided by a telecommunication service provider to identify one or more factors, the service requiring use of capital equipment, wherein the capital equipment comprises infrastructure needed for the telecommunication service provider to provide the service and the customer data includes at least the contract data;
calculating a fraction of capital equipment cost value corresponding to the capital equipment based on the factors;
executing a customer deal evaluation model to generate a pricing scheme corresponding to the service and the customer, based on a total cost of acquiring capital value and the fraction of capital equipment cost value; and
automatically causing the pricing scheme to be displayed in the graphical user interface.

9. The method of claim 8, wherein executing a customer deal evaluation model based on the total cost of acquiring capital value and the fraction of capital equipment cost value comprises:
multiplying the total cost of acquiring capital value by the fraction of capital equipment cost value to generate a result; and
calculating at least one customer evaluation metric, adjusted according to the result.

10. The method of claim 9, wherein the metric is selected from at least one of a net present value metric, an internal rate of return metric, a payback metric, or an EBITDA less CapEx metric.

11. The method of claim 8, wherein the one or more factors is at least one of a contract term length, a useful equipment life value, a price compression rate, and a capital discount rate.

12. The method of claim 8, further comprising:
receiving customer data uniquely identifying the customer and the contract data from a user-interface generated by the at least one processor.

13. The method of claim 8, wherein the one or more factors includes a price compression percentage and wherein calculating the fraction of capital equipment cost value comprises accessing a price compression table, stored in a database, corresponding to the price compression percentage to determine the fraction of capital equipment cost value.

14. The method of claim 8, wherein the one or more factors includes a contract term, a useful equipment life value, a price compression rate, and a capital discount rate and wherein the fraction of capital equipment cost value is calculated using the following equation:

$$\gamma = \frac{\sum_{t=o}^{T-1} r^t}{\sum_{t=o}^{U-1} r^t} = \frac{\frac{1-r^T}{1-r}}{\frac{1-r^U}{1-r}} = \frac{1-r^T}{1-r^U}$$

wherein $\gamma$ is the fraction of capital equipment, T is the contract term, U is the useful equipment life value, c is the price compression rate, d is the capital discount rate, and r is equal to $(1-c)/(1+d)$.

15. A non-transitory computer readable medium storing instructions for calculating fractional capital equipment costs, the instructions, when executed by at least one executable by a processor, causing the at least one processor to perform a method, the method comprising:
providing a graphical user interface for receiving an instruction to perform a customer deal evaluation;
retrieving from a database customer data corresponding to a potential customer of a service from a telecommunication service provider, the service requiring use of capital equipment, wherein the capital equipment comprises infrastructure needed for the telecommunication service provider to provide the service and the customer data includes at least contract data;
processing the customer data to identify one or more factors;
calculating a fraction of capital equipment cost value corresponding to the capital equipment based on the factors;
executing a customer deal evaluation model to generate a pricing scheme corresponding to the service and the customer based on a total cost of acquiring capital value and the fraction of capital equipment cost value; and
automatically causing the pricing scheme to be displayed in the graphical user interface.

16. The non-transitory computer readable medium of claim 15, wherein executing a customer deal evaluation model based on the total cost of acquiring capital value and the fraction of capital equipment cost value comprises:
multiplying the total cost of acquiring capital value by the fraction of capital equipment cost value to generate a result; and
calculating at least one customer evaluation metric, adjusted according to the result.

17. The non-transitory computer readable medium of claim 16, wherein the metric is selected from at least one of a net present value metric, an internal rate of return metric, a payback metric, or an EBITDA less CapEx metric.

18. The non-transitory computer readable medium of claim 15, wherein the one or more factors is at least one of a contract term length, a useful equipment life value, a price compression rate, and a capital discount rate.

19. The non-transitory computer readable medium of claim 15, wherein obtaining the customer data comprises:

accessing the customer data from a user-interface.

20. The non-transitory computer readable medium of claim 15, wherein the one or more factors includes a price compression percentage and wherein calculating the fraction of capital equipment cost value comprises accessing a price compression table, maintained in a database, corresponding to the price compression percentage to determine the fraction of capital equipment cost value.

21. The non-transitory computer readable medium of claim 15, wherein the one or more factors includes a contract term, a useful equipment life value, a price compression rate, and a capital discount rate and wherein the fraction of capital equipment cost value is calculated using the following equation:

$$\gamma = \frac{\sum_{t=o}^{T-1} r^t}{\sum_{t=o}^{U-1} r^t} = \frac{\frac{1-r^T}{1-r}}{\frac{1-r^U}{1-r}} = \frac{1-r^T}{1-r^U}$$

wherein $\gamma$ is the fraction of capital equipment, T is the contract term, U is the useful equipment life value, c is the price compression rate, d is the capital discount rate, and r is equal to $(1-c)/(1+d)$.

* * * * *